(12) United States Patent
Kiyokawa et al.

(10) Patent No.: US 12,163,823 B2
(45) Date of Patent: Dec. 10, 2024

(54) WEIGHT ESTIMATION APPARATUS, WEIGHT ESTIMATION METHOD, AND COMPUTER-READABLE RECORDING MEDIUM

(71) Applicant: NEC Corporation, Tokyo (JP)

(72) Inventors: Yu Kiyokawa, Tokyo (JP); Shigeru Kasai, Tokyo (JP); Shohei Kinoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 447 days.

(21) Appl. No.: 17/613,128

(22) PCT Filed: May 30, 2019

(86) PCT No.: PCT/JP2019/021644
§ 371 (c)(1),
(2) Date: Nov. 22, 2021

(87) PCT Pub. No.: WO2020/240800
PCT Pub. Date: Dec. 3, 2020

(65) Prior Publication Data
US 2022/0205829 A1    Jun. 30, 2022

(51) Int. Cl.
*G01G 19/03* (2006.01)
*G01P 15/08* (2006.01)

(52) U.S. Cl.
CPC ........ *G01G 19/035* (2013.01); *G01P 15/0802* (2013.01); *G01P 2015/0865* (2013.01)

(58) Field of Classification Search
CPC ............... G01G 19/035; G01G 19/022; G01P 15/0802; G01P 2015/0865
USPC ....................................................... 177/25.12
See application file for complete search history.

(56) References Cited

U.S. PATENT DOCUMENTS

| | | | |
|---|---|---|---|
| 7,039,519 B2* | 5/2006 | Ishiguro ............... | G01G 19/086 |
| | | | 701/124 |
| 9,842,438 B1 | 12/2017 | Bradley et al. | |
| 10,473,515 B2* | 11/2019 | Imagawa ............. | G06V 20/588 |
| 10,877,061 B2* | 12/2020 | Kobayashi ............ | G01N 29/04 |
| 11,455,372 B2* | 9/2022 | Nakano ................... | G06F 17/18 |
| 11,485,189 B2* | 11/2022 | Kizu .................. | B60G 17/0155 |
| 11,821,815 B2* | 11/2023 | Nakano ............... | G01M 5/0008 |
| 11,891,145 B2* | 2/2024 | Kawasaki ............. | B62K 25/04 |
| 2016/0114809 A1 | 4/2016 | Savaresi et al. | |

(Continued)

FOREIGN PATENT DOCUMENTS

| | | |
|---|---|---|
| CN | 104792937 A | 7/2015 |
| JP | 2016-519317 A | 6/2016 |

(Continued)

OTHER PUBLICATIONS

International Search Report for PCT Application No. PCT/JP2019/021644, mailed on Aug. 20, 2019.

(Continued)

*Primary Examiner* — Jacques M Saint Surin
(74) *Attorney, Agent, or Firm* — Sughrue Mion, PLLC (57) ABSTRACT

A weight estimation apparatus 1 includes: an impulsive force calculation unit 2 calculating an impulsive force using an acceleration response indicating vibration generated in a structure by the moving object (vehicle 27) moving through the structure, and a weight estimation unit 3 estimating a weight of the moving object using the impulsive force.

19 Claims, 7 Drawing Sheets

(56) References Cited

U.S. PATENT DOCUMENTS

2018/0364047 A1* 12/2018 Azami ............... G01P 7/00
2020/0133998 A1* 4/2020 Ito ............... G06N 7/01
2022/0178735 A1* 6/2022 Nakano ............... G01B 11/16

FOREIGN PATENT DOCUMENTS

| JP | 2018-066637 A | 4/2018 |
| JP | 2018-527641 A | 9/2018 |

OTHER PUBLICATIONS

Hidehiko Sekiya, Takuyo Konishi, Takeshi Kinomoto, and Chitoshi Miki, "Portable-Weigh-In-Motion Based in Displacement Measurement Using MEMS Accelerometer", Proceedings of Japan Society of Civil Engineers A1 (Structure / Earthquake Engineering), vol. 72, No. 3, Oct. 2016, pp. 364-379.

Beppu, Masuhiro, Kogure, Kanta, Sakamaki, Masuru, Ohno, Tomonori, "Measuring Force-Time Variations and Data Processing Procedure in Low-Velocity Impact Tests for RC Beams", Doboku Gakkai Ronbunshu, Jan. 2003, No. 724/I-62, pp. 141-156.

English translation of Written opinion for PCT Application No. PCT/JP2019/021644, mailed on Aug. 20, 2019.

* cited by examiner

WEIGHT ESTIMATION APPARATUS, WEIGHT ESTIMATION METHOD, AND COMPUTER-READABLE RECORDING MEDIUM

This application is a National Stage Entry of PCT/JP2019/021644 filed on May 30, 2019, the contents of all of which are incorporated herein by reference, in their entirety.

TECHNICAL FIELD

The invention relates to a weight estimation apparatus and a weight estimation method that estimate a weight, and further relates to a computer-readable recording medium where a program for realizing these is recorded.

BACKGROUND ART

An overloaded vehicle can cause accidents. In addition, the overloaded vehicle must keep high rotation velocity of engine during normal traveling, so that the engine noise becomes loud, and it causes an adverse effect on the environment. Further, the overloaded vehicle not only increases tire wear, but also causes fatigue damage to the structure in which the vehicle travels.

In view of this, Non-Patent Document 1 discloses a technique for grasping the weight of a vehicle as a technique for suppressing the above-mentioned fatigue damage to the structure. According to the technique disclosed in Non-Patent Document 1, when a vehicle passes over a bridge, a displacement response is calculated by executing a double integration using an acceleration at a lower flange of the bridge, and a weight of the traveling vehicle is estimated from the displacement response.

LIST OF RELATED ART DOCUMENTS

Non-Patent Document

Non-Patent Document 1: Hidehiko SEKIYA, Takuyo KONISHI, Takeshi KINOMOTO, and Chitoshi MIKI, "PORTABLE-WEIGH-IN-MOTION BASED ON DISPLACEMENT MEASUREMENT USING MEMS ACCELEROMETER" Proceedings of Japan Society of Civil Engineers A1 (Structure/Earthquake Engineering), Vol. 72, No. 3, 364-379 October 2016

SUMMARY

Technical Problems

However, according to Non-Patent Document 1, when a deflection amount (strain amount) of the bridge is estimated from the acceleration, the double integration in the time direction is executed, so that the estimation accuracy of the deflection amount is reduced caused by (i) the uncertainty of the integration boundary condition and (ii) the integration constant being not 0 (the vibration around the origin is not established). Therefore, when the weight of the vehicle is estimated using the estimated deflection amount, it can be obtained only the weight with low estimation accuracy.

An example object of the invention is to provide a weight estimation apparatus, a weight estimation method that estimate a weight, and a computer-readable recording medium that improve the accuracy of weight estimation of a moving object.

Solution to the Problems

In order to achieve the example object described above, a weight estimation apparatus according to an example aspect of the invention includes:

an impulsive force calculation unit that executes a short-time Fourier transform on the acceleration response indicating the vibration generated in a structure by the moving object moving through the structure, and calculating the impulsive force using the result of the short-time Fourier transform; and a weight estimation unit that estimates the weight of the moving object using the impulsive force.

Also, in order to achieve the example object described above, a weight estimation method according to an example aspect of the invention includes:

executing a short-time Fourier transform on the acceleration response indicating the vibration generated in a structure by the moving object moving through the structure, and calculating the impulsive force using the result of the short-time Fourier transform; and estimating the weight of the moving object using the impulsive force.

Furthermore, in order to achieve the example object described above, a computer-readable recording medium according to an example aspect of the invention includes a program recorded on the computer-readable recording medium and including instructions that cause a computer to carry out:

executing a short-time Fourier transform on the acceleration response indicating the vibration generated in a structure by the moving object moving through the structure, and calculating the impulsive force using the result of the short-time Fourier transform; and estimating the weight of the moving object using the impulsive force.

Advantageous Effects of the Invention

As described above, according to the invention, it is possible to improve the accuracy of weight estimation of a moving object.

EXAMPLE EMBODIMENT

Example Embodiment

Figure 1:
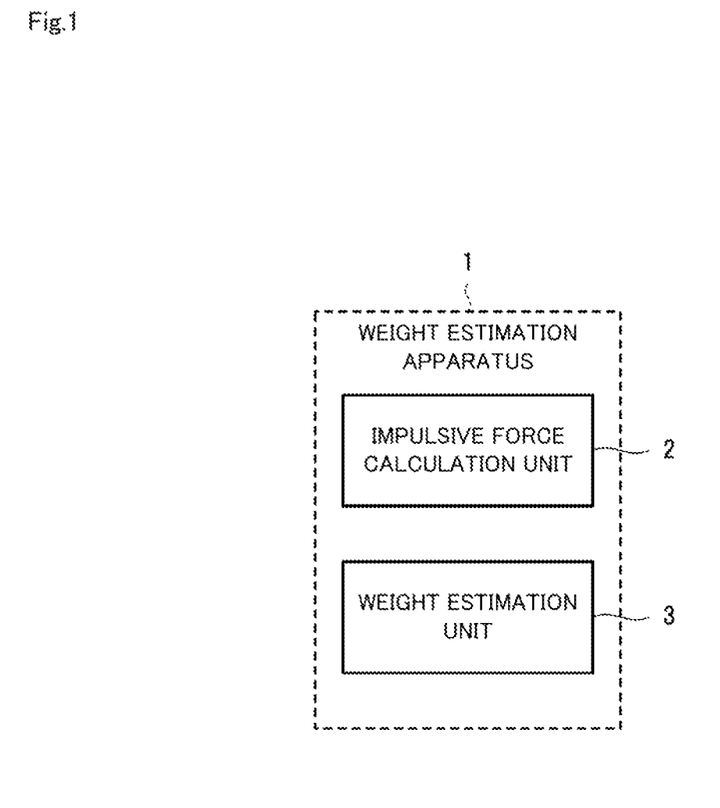
FIG. 1 illustrates an example of a weight estimation apparatus.

The following describes an example embodiment with reference to FIGS. 1 to 7.
[Apparatus Configuration]
First, the configuration of a weight estimation apparatus 1 according to the example embodiment will be described with reference to FIG. 1. FIG. 1 illustrates an example of a weight estimation apparatus.

The weight estimation apparatus shown in FIG. 1 is a device that improves the accuracy of weight estimation of a moving object. Also, as shown in FIG. 1, the weight estimation apparatus 1 includes an impulsive force calculation unit 2 and a weight estimation unit 3.

Of these, the impulsive force calculation unit 2 executes a short-time Fourier transform on an acceleration response representing vibration generated in the structure by the moving object moving through the structure, and calculating an impulsive force using a result of the short-time Fourier transform. The weight estimation unit 3 estimates the weight of the moving object using the impulsive force.

Here, the structure is, for example, a cured product (concrete, mortar, etc.) solidified with at least sand, water, and cement; or a metal; or a structure constructed using them. In addition, the structure is the whole building or a part thereof. Further, the structure is the whole machine or a part thereof. The moving object is, for example, a vehicle that moves through a structure.

The acceleration response is generated using the acceleration measured by the acceleration measuring unit installed in the structure. The impulsive force is represented by the change in momentum as shown in the upper part of Math. 1. Also, when a short-time Fourier transform (STFT) is applied to the acceleration response, the sum of squares of the spectral amplitudes is considered to be the kinetic energy given in a short time. Therefore, assuming that the impulsive force is applied in the direction of gravity, the square root of energy is proportional to the momentum. Therefore, the impulsive force can be expressed as shown in the lower part of Math. 1. The kinetic energy can be expressed by $p^2/2m$.

$$\vec{F}\Delta t = M(\vec{g} + \vec{a}^v(t_0))\Delta t = \vec{p}(t_0 + \Delta t) - \vec{p}(t_0) \quad [\text{Math. 1}]$$

$$\approx \sqrt{2m \int_0^\infty STFT(t, f)^2 df}$$

$\vec{F}\Delta t$: IMPULSIVE FORCE $\Delta t$: UNIT TIME (WINDOW SIZE OF SHORT-TIME FOURIER TRANSFORM (STFT))

$M$: WEIGHT OF MOVING OBJECT $\vec{g}$: GRAVITATIONAL ACCELERATION($= 9.8[M/S^2]$)

$t_0$: MEASUREMENT START TIME $\vec{a}^v$: UNIQUE ACCELERATION GENERATED FOR EACH MOVING OBJECT $\vec{p}$: MOMENTUM $m$: WEIGHT OF SENSOR $t$: TIME $f$: FREQUENCY The estimated weight of the moving object is calculated by applying the calculated impulsive force to Math. 2. That is, the weight estimation unit 1 estimates the weight of the moving object by using the impulsive force, the gravitational acceleration, and the unit time representing the window size used in the short-time Fourier transform.

$$M' = \frac{1}{g\Delta t}\sqrt{2m \int_0^\infty STFT(t, f)^2 df} \quad [\text{Math. 2}]$$

$M'$: ESTIMATED WEIGHT OF MOVING OBJECT

In Math. 2, the value multiplied by the unique acceleration generated for each moving object shown in Math. 1 described above and the unit time is regarded as 0. The reason is that the acceleration can be assumed to be 0 because the acceleration is assumed to increase the apparent weight of the moving object due to downforce or the like. Further, when the weight of the sensor is small, the impulsive force can be approximated without considering 2 m of Math. 1.

As the other method, the estimated weight of the moving object is calculated by applying the calculated impulsive force to the regression model. The details of weight estimation using the regression model will be described below.

As described above, in the example embodiment, since the weight of the moving object can be estimated by using the impulsive force obtained from the acceleration response, double integration in the time direction becomes unnecessary. That is, there is no decrease in the accuracy of the weight estimation of the moving object due to (i) the uncertainty of the integration boundary condition and (ii) the fact that the integration constant is not 0 (vibration around the origin is not established). Therefore, it is possible to improve the accuracy of weight estimation of the moving object.

Figure 2:
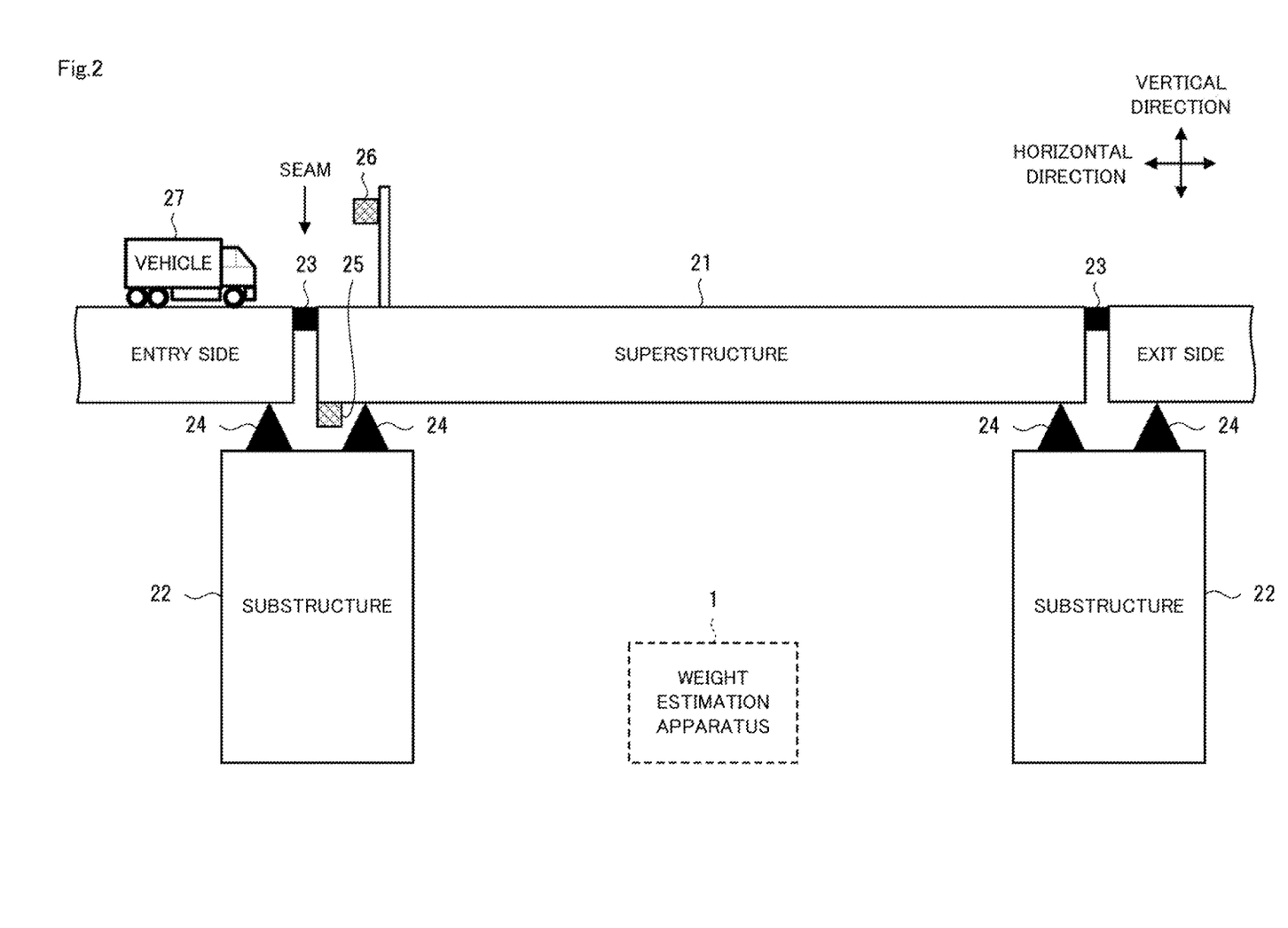
FIG. 2 is a schematic view showing an example of the structure.
Figure 3:
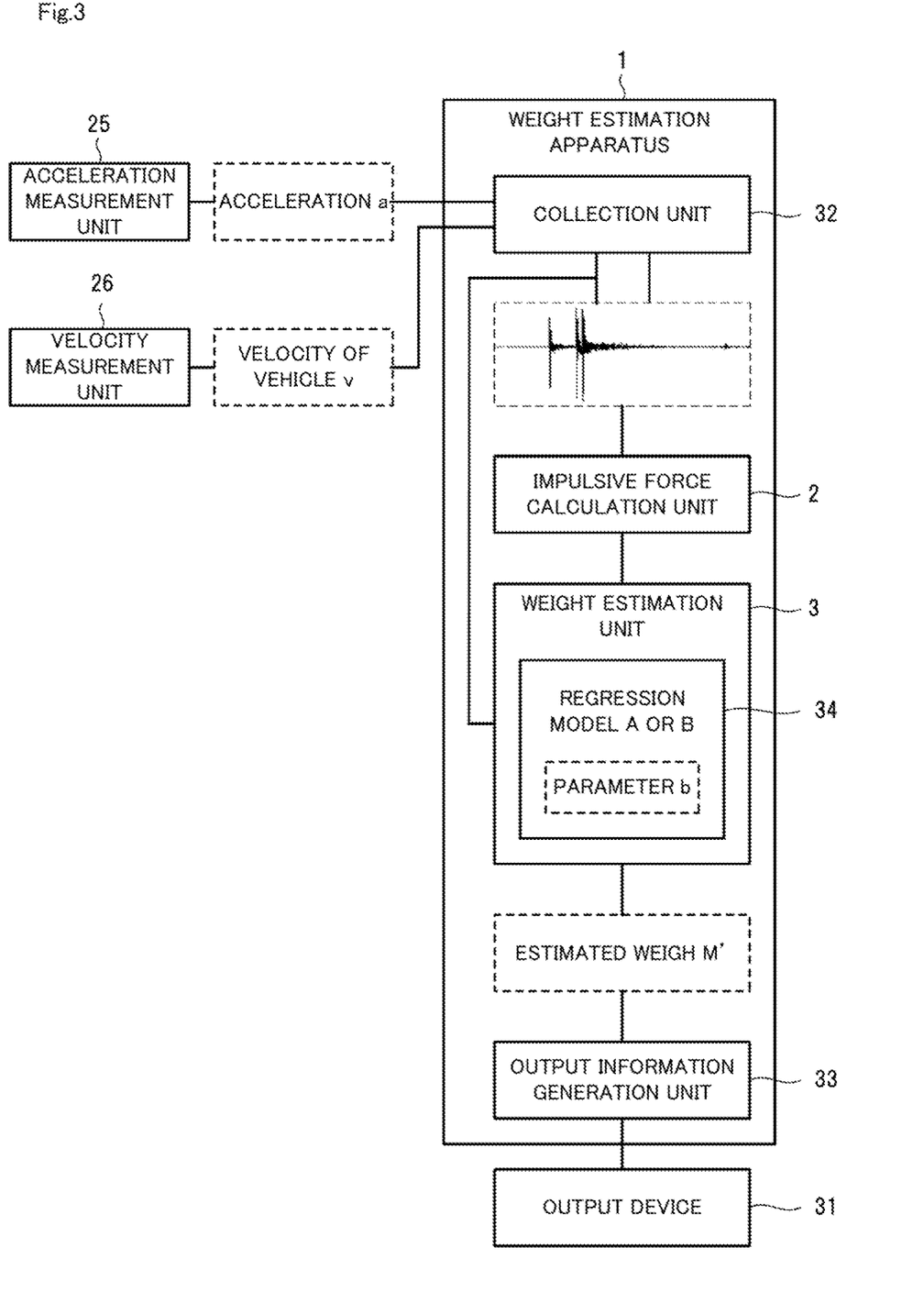
FIG. 3 illustrates an example of a system that includes the weight estimation apparatus.

Further, in the example embodiment, since it does not need the double integration in the time direction, the amount of calculation can be reduced as compared with the conventional case.
[System Configuration]
Subsequently, the weight estimation apparatus according to the example embodiment will be described with reference to FIGS. 2 and 3. FIG. 2 is a schematic view showing an example of the structure. FIG. 3 illustrates an example of a system that includes the weight estimation apparatus.

The structure will be described.

The structure shown in FIG. 2 is, for example, a bridge and the like. The structure shown in FIG. 2 includes a superstructure 21, a substructure 22, an expansion/contraction portion 23, a bearing 24, and the like. Further, an acceleration measuring unit 25 and a velocity measuring unit 26 are installed in the structure shown in FIG. 2. Further, the vehicle 27 (moving object) shown in FIG. 2 passes through the expansion/contraction portion 23 from the approach side of the superstructure 21 and moves to the exit side of the superstructure 21.

The superstructure 21 includes a floor structure and a main structure. The floor structure is formed by a floor slab, a floor structure, or the like. The main structure includes a main girder and the like, supports the floor structure, and transmits the load to the substructure 22.

The substructure 22 has a bridge pedestal installed at both ends of the bridge, a pier installed in the middle of the bridge, and a foundation for supporting them, which supports the superstructure 21 and transmits a load to the ground.

The expansion/contraction portion 23 is a device that enables expansion and contraction of the bridge at the end of the bridge. In the example of FIG. 2, it is installed at the seam between the superstructures 21.

The bearing 24 is a member installed between the superstructure 21 and the substructure 22. The bearing 24 transmits the load applied to the superstructure 21 to the substructure 22.

The acceleration measuring unit 25 is a sensor attached to the superstructure 21 and measures the magnitude of vibration of the structure, and transmits information indicating the magnitude of the measured vibration to the weight estimation apparatus 1. It is conceivable that the acceleration measuring unit 25 uses, for example, a triaxial acceleration sensor, a fiber sensor, or the like to measure the acceleration representing the vibration of the superstructure 21.

Specifically, as shown in FIG. 2, the acceleration measuring unit 25 is attached to the superstructure 21 and measures the acceleration at the position where the acceleration measuring unit 25 is attached. Subsequently, the acceleration measurement unit 25 transmits a signal having the measured acceleration to the weight estimation apparatus 1. Wired communication, wireless communication, or the like is used for communication between the acceleration measuring unit 25 and the weight estimation apparatus 1.

It is desirable that the acceleration measuring unit 25 be installed at a position that is not easily affected by the natural vibration of the structure. In the example of FIG. 2, the acceleration measuring unit 25 is installed at a position close to the end side of the superstructure 21. The reason is that the closer to the end side of the superstructure 21, the smaller the influence of natural vibration.

The velocity measuring unit 26 is a sensor or the like that measures the velocity of the vehicle 27. Specifically, the velocity measuring unit 26 measures the velocity of the vehicle 27 moving on the expansion/contraction portion 23. Subsequently, the velocity measuring unit 26 transmits a signal having information representing the measured velocity to the weight estimation apparatus 1. Wired communication, wireless communication, or the like is used for communication between the velocity measuring unit 26 and the weight estimation apparatus 1.

In the velocity measurement, it is sufficient that the velocity of the vehicle 27 can be detected. Therefore, the velocity measuring unit 26, for example, may calculate the velocity of the vehicle 27 by using a plurality of images of the vehicle 27 passing through the expansion/contraction portion 23 imaged by the imaging device in time series.

The vehicle 27 travels on the superstructure 21 from the entry side to the exit side and gives an impact to the superstructure 21. In the example of FIG. 2, when the vehicle 27 passes through the expansion/contraction portion 23 (seam), an impact is applied to the superstructure 21 with the seam as a fulcrum, and the superstructure 21 is vibrated. Although the expansion/contraction portion 23 is used as the one that gives an impact to the superstructure 21 in FIG. 2, any one that gives an impact to the structure may be used.

Weight estimation will be described.

As shown in FIG. 3, the system according to the example embodiment includes an output device 31 in addition to the weight estimation apparatus 1, the acceleration measurement unit 25, and the velocity measurement unit 26. The system shown in FIG. 3 is a system used when estimating the weight of the vehicle 27.

The weight estimation apparatus 1 collects acceleration and velocity. Subsequently, the weight estimation apparatus 1 uses the acceleration to generate an acceleration response used for weight estimation of the vehicle 27.

Subsequently, the weight estimation apparatus 1 calculates the impulsive force using the generated acceleration response. Specifically, the weight estimation apparatus 1 calculates the impulsive force using the Math. 1.

Subsequently, the weight estimation apparatus 1 estimates the weight of the vehicle 27 using the calculated impulsive force. Specifically, the weight estimation apparatus 1 estimates the weight of the vehicle 27 using Math. 2. Alternatively, the weight estimation apparatus 1 estimates the weight of the vehicle 27 using the regression model.

The output device 31 acquires the output information converted into an outputable format by the output information generation unit 33, and outputs the generated image, sound, and the like based on the output information. The output device 31 is, for example, an image display device using a liquid crystal display, an organic EL (Electro Luminescence), or a CRT (Cathode Ray Tube). Further, the image display device may include an audio output device such as a speaker.

The output device 31 may be a printing device such as a printer. The output information generation unit 33 will be described below.

The weight estimation apparatus will be described.

The weight estimation apparatus 1 includes a collection unit 32 and an output information generation unit 33 in addition to the impulsive force calculation unit 2 and the weight estimation unit 3. However, when the weight of the vehicle 27 is estimated using the Math. 2, the regression model 34 is not necessary.

The collection unit 32 acquires the acceleration and the velocity.

Specifically, the collection unit 32 first receives the acceleration measured by the acceleration measuring unit 25 attached to the superstructure 21 and the velocity measured by the velocity measuring unit 26. Subsequently, the collection unit 32 transfers the acceleration and the velocity to the impulsive force calculation unit 2. Further, the collection unit 32 transfers the velocity to the weight estimation unit 3.

The impulsive force calculation unit 2 calculates the impulsive force using the acceleration response. Specifically, the impulsive force calculation unit 2 first detects a period time during the vehicle 27 has passed through the expansion/contraction portion 23.

Subsequently, the impulsive force calculation unit 2 executes a short-time Fourier transform (STFT) on the acceleration response representing the vibration generated by the vehicle 27 passing through the expansion/contraction portion 23 during the detected period. It is desirable that the impulsive force calculation unit 2 calculates the window size (unit time $\Delta t$) used in the STFT according to the velocity.

Subsequently, the impulsive force calculation unit 2 applies the result of the short-time Fourier transform to the lower equation of Math. 1 to calculate the impulsive force. For example, the impulsive force calculation unit 2 squares the result of the short-time Fourier transform (STFT (t, f): spectral amplitude) and integrates the squared result to calculate the kinetic energy.

After that, since the kinetic energy can be expressed by $p^2/2\,m$, the impulsive force calculation unit 2 multiplies the calculated kinetic energy by 2 m, calculates the square root of the multiplication result, the calculated result is defined as impulsive force. Subsequently, the impulsive force calculation unit 2 transfers the calculated impulsive force to the weight estimation unit 3.

The weight estimation unit 3 estimates the weight of the vehicle 27 using the impulsive force calculated by the impulsive force calculation unit 2. Specifically, the weight estimation unit 3 estimates the weight of the vehicle 27 by using any of the methods (1), (2), and (3) shown below.

(1) Method without using the regression model
(1) In the method without using the regression model, the weight of the vehicle 27 is estimated without using the regression model 34 shown in FIG. 3. Specifically, the weight estimation unit 3 first acquires the impulsive force from the impulsive force calculation unit 2. Subsequently, the weight estimation unit 3 applies the acquired impulsive force to Math. 2 to estimate the weight of the vehicle 27.

That is, the weight estimation unit 3 divides the impulsive force by the gravitational acceleration and the unit time to estimate the weight of the vehicle 27.

(2) Method using regression model A
(2) In the method using regression model A, the regression model 34 shown in FIG. 3 is defined as regression model A. In that case, the weight estimation unit 3 applies the impulsive force to the regression model 34 (regression model A) to estimate the weight of the vehicle 27.

As shown in FIG. 3, the regression model A may be stored in a storage unit included in the weight estimation unit 3, or may be stored in a storage unit installed other than the weight estimation unit 3.

Specifically, the weight estimation unit 3 first acquires the impulsive force from the impulsive force calculation unit 2. Subsequently, the weight estimation unit 3 inputs the impulsive force into the regression model 34 (regression model A) to estimate the weight of the vehicle 27.

For example, in the method using the regression model A, the weight of the vehicle 27 is estimated using the regression model A as shown in Math. 3. The generation of the regression model A will be described below.

$$M' = \left(b_0 + b_1 \cdot \vec{F}\Delta t\right) \qquad \text{[Math. 3]}$$

$M'$: ESTIMATED WEIGHT OF MOVING OBJECT $b_0, b_1$: PARAMETER $\vec{F}\Delta t$: IMPULSIVE FORCE (3) Method of further using the velocity for the regression model B
(3) In the method of using the regression model B, the regression model 34 shown in FIG. 3 is defined as the regression model B. In that case, the weight estimation unit 3 inputs the impulsive force and the velocity of the vehicle 27 into the regression model 34 (regression model B) to estimate the weight of the vehicle 27.

As shown in FIG. 3, the regression model B may be stored in a storage unit included in the weight estimation unit 3, or may be stored in a storage unit installed other than the weight estimation unit 3.

Specifically, the weight estimation unit 3 first acquires the impulsive force from the impulsive force calculation unit 2. Subsequently, the weight estimation unit 3 inputs the impulsive force and the velocity into the regression model 34 (regression model B) to estimate the weight of the vehicle 27.

For example, in the method using the regression model B, the weight of the vehicle 27 is estimated using the regression model B as shown in Math. 4. The generation of the regression model B will be described below.

$$M' = \left(b_0 + b_1 \cdot \vec{F}\Delta t + b_2 \cdot v\right) \qquad \text{[Math. 4]}$$

$M'$: ESTIMATED WEIGHT OF MOVING OBJECT $b_0, b_1, b_2$: PARAMETER $\vec{F}\Delta t$: IMPULSIVE FORCE $v$: VELOCITY OF MOVING OBJECT The output information generation unit 33 acquires the estimated weight of the vehicle 27 from the weight estimation unit 3, and generates output information to output the estimated weight to the output device 31 using the estimated weight. Subsequently, the output information generation unit 33 outputs the generated output information to the output device 31.

The regression mode will be described.

Figure 4:
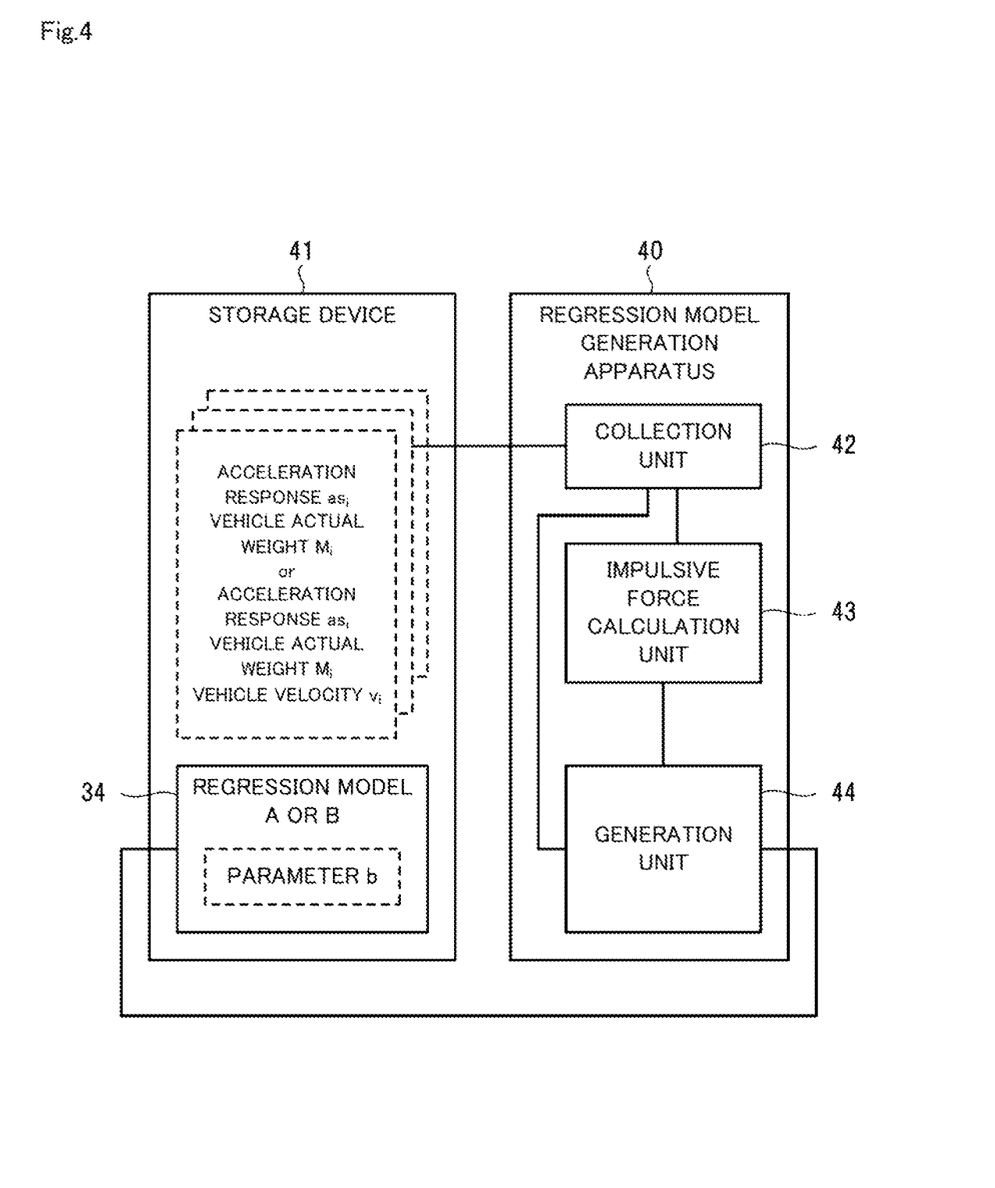
FIG. 4 illustrates an example of a system that includes a regression model generating apparatus.

Subsequently, the regression model generating apparatus according to the example embodiment will be described with reference to FIG. 4. FIG. 4 illustrates an example of a system that includes regression model generating apparatus.

The system shown in FIG. 4 includes a regression model generation apparatus 40 and a storage device 41. Further, the regression model generation apparatus 40 shown in FIG. 4 includes a collection unit 42, an impulsive force calculation unit 43, a generation unit 44, and the like.

When (2) the regression model A is used, the regression model generating apparatus 40 executes regression analysis to generate regression model A using the data set, generated for each of a plurality of vehicles, associated with the actual weight of the vehicle (moving object) measured in advance and acceleration response corresponding to the vibration generated by the vehicle. After that, the regression model generation apparatus 40 stores the generated regression model A in the storage device 41.

The data set used in the generation of the regression model A is generated for each of a plurality of vehicles. The user, for example, generates the data set in advance for each of different types of vehicles and vehicles of different weights, and stores the data set in the storage device 41.

Alternatively, when (3) the regression model generation apparatus 40 uses regression model B, the regression model generating apparatus 40 executes regression analysis to generate regression model B using the data set, generated for each of a plurality of vehicles, associated with the actual weight of the vehicle (moving object) measured in advance, the acceleration response corresponding to the vibration generated by the vehicle, and the velocity of the vehicle. After that, the regression model generation apparatus 40 stores the generated regression model B in the storage device 41.

The data set used in the generation of the regression model B is generated for each of a plurality of vehicles. The user, for example, generates a data set in advance for each of different types of vehicles and vehicles of different weights, and stores the data set in the storage device 41.

The regression model generation apparatus 40 is, for example, an information processing device such as a server computer.

The storage device 41 is a device that stores a data set in which the actual weight of the vehicle (moving object) measured in advance and the acceleration response corresponding to the vibration generated by the vehicle are associated with each other. Further, the storage device 41 stores the regression model A or B generated by the regression model generation apparatus 40. The storage device 41, for example, may be installed inside or outside the regression model generation apparatus 40.

The regression model generating apparatus will be described.

When generating the regression model A, the collection unit 42 acquires a data set in which the actual weight, the acceleration response, and the velocity for each of a plurality of vehicles are associated with each other, which is stored in the storage device 41, and transfers the acceleration response to the force calculation unit 2. Further, the collection unit 42 transfers the actual weight to the generation unit 44.

Alternatively, when generating the regression model B, the collection unit 42 acquires a data set in which the actual weight, the acceleration response, and the velocity for each of a plurality of vehicles are associated with each other, which is stored in the storage device 41, and transfers the acceleration response to the impulsive force calculation unit 2. Further, the collection unit 42 transfers the actual weight and the velocity to the generation unit 44.

The impulsive force calculation unit 43 calculates the impulsive force using the acceleration response. Specifically, the impulsive force calculation unit 43 first acquires the acceleration response from the collection unit 42. Subsequently, the impulsive force calculation unit 2 executes a short-time Fourier transform (STFT) for each acceleration response. It is desirable that the impulsive force calculation unit 43 calculates the window size (unit time Δt) used in the STFT according to the velocity.

Subsequently, the impulsive force calculation unit 43 applies the result of the short-time Fourier transform to the lower equation of Math. 1 to calculate the impulsive force for each of a plurality of vehicles.

For example, the impulsive force calculation unit 43 squares the result of the short-time Fourier transform (STFT (t, f): spectral amplitude) and integrates the squared result to calculate the kinetic energy. After that, since the kinetic energy can be expressed by $p^2/2$ m, the impulsive force calculation unit 2 multiplies the calculated kinetic energy by 2 m, calculates the square root of the multiplication result, and the calculated result is defined as impulsive force.

Subsequently, the impulsive force calculation unit 2 transfers the calculated impulsive force for each of the plurality of vehicles to the generation unit 44.

The generation unit 44 generates a regression model using the data sets of a plurality of vehicles, and stores the generated regression model in the storage device 41.

Specifically, when generating the regression model A, the generation unit 44 executes a regression analysis using the impulsive force and the actual weight of each of the plurality of vehicles to generate the regression model A shown in Math. 3.

In that case, the generation unit 44 obtains parameters b0 and b1 such that the output value L1 of an error function is equal to or less than a predetermined value using the error function as shown in Math. 5, for example. The predetermined value may be, for example, a minimum value or a value obtained by experiment or simulation.

$$L1 = \sum_i \{M_i - (b_0 + b_1 \cdot F_i)\}^2 \quad \text{[Math. 5]}$$

$L1$: OUTPUT VALUE OF ERROR FUNCTION $M_i$: ACTUAL WEIGHT OF A PLURALITY OF MOVING OBJECTS $F_i$: IMPULSIVE FORCE OF A PLURALITY OF MOVING OBJECTS $i$: NUMBER OF MOVING OBJECTS

Alternatively, when generating the regression model B, the generation unit 44 executes a regression analysis using the impulsive force, the actual weight, and the velocity of each of the plurality of vehicles to generate the regression model B shown in Math. 4.

In that case, the generation unit 44 obtains parameters b0, b1, and b2 such that the output value L2 of an error function is equal to or less than a predetermined value using the error function as shown in Math. 6, for example. The predetermined value may be, for example, a minimum value or a value obtained by experiment or simulation.

$$L2 = \sum_i \{M_i - (b_0 + b_1 \cdot F_i + b_2 \cdot v_i)\}^2 \quad \text{[Math. 6]}$$

$L2$: OUTPUT VALUE OF ERROR FUNCTION $M_i$: ACTUAL WEIGHT OF A PLURALITY OF MOVING OBJECTS $F_i$: IMPULSIVE FORCE OF A PLURALITY OF MOVING OBJECTS $i$: NUMBER OF MOVING OBJECTS

Subsequently, the generation unit 44 stores the generated regression model A or regression model B in the storage device 41. The generation unit 44 may directly store the generated regression model A or regression model B in the weight estimation unit 3.

[Apparatus Operations]

Figure 5:
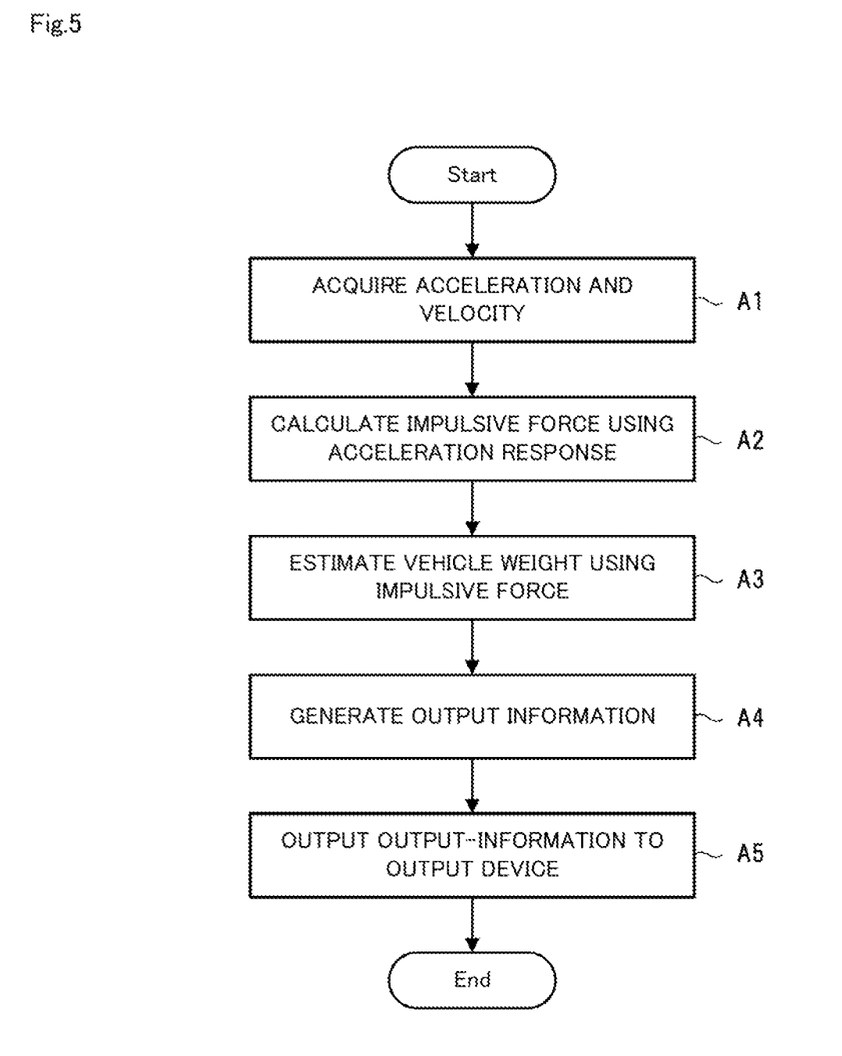
FIG. 5 is a flow chart showing an example of the operation of the weight estimation apparatus.

Next, the operation of the weight estimation apparatus according to the example embodiment will be described with reference to FIG. 5. FIG. 5 is a flow chart showing an example of the operation of the weight estimation apparatus. In the following description, FIGS. 2 to 3 will be referred to as appropriate. Further, in the example embodiment, the weight estimation method is implemented by operating the weight estimation apparatus. Therefore, the description of the weight estimation method in the example embodiment will be replaced with the following description of the operation of the weight estimation apparatus.

Figure 6:
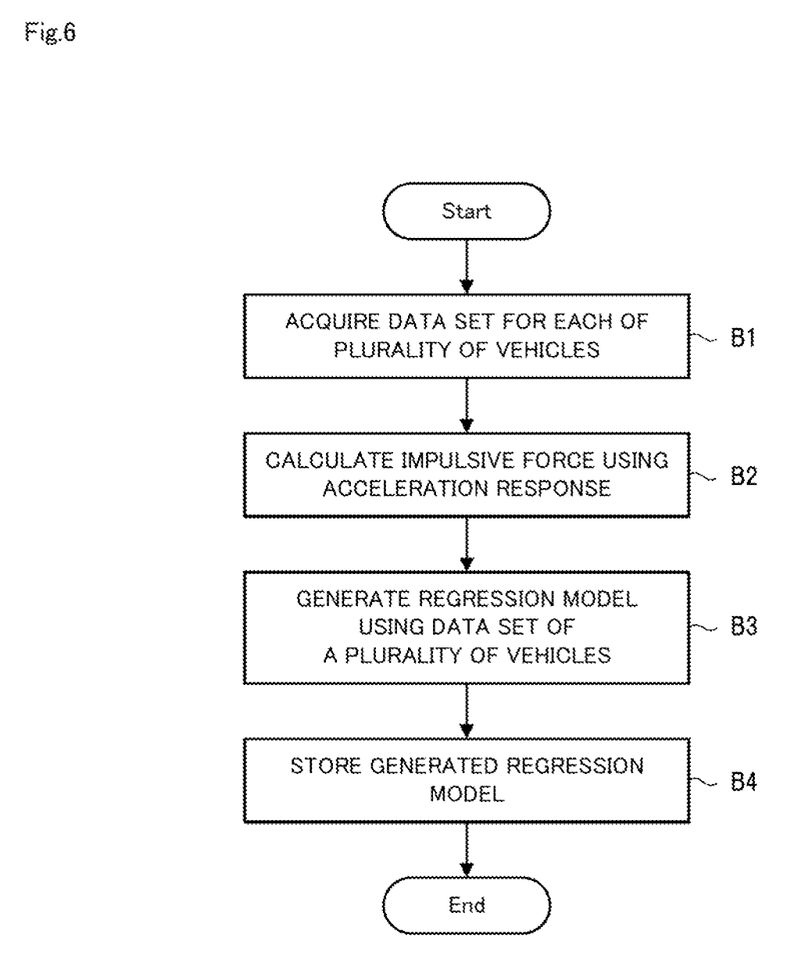
FIG. 6 is a flow chart showing an example of the operation of the regression model generating apparatus.

Further, the operation of the regression model generating apparatus according to the example embodiment will be described with reference to FIG. 6. FIG. 6 is a flow chart showing an example of the operation of the regression model generating apparatus. In the following description, FIG. 4 will be referred to as appropriate. Further, in the example embodiment, the regression model generation method is implemented by operating the regression model generation apparatus. Therefore, the description of the regression model generation method in the example embodiment will be replaced with the following description of the operation of the regression model generation apparatus.

The operation of the weight estimation apparatus will be described.

As shown in FIG. 5, first, the collection unit 32 acquires the acceleration and the velocity (step A1). Specifically, in step A1, the collection unit 32 first receives the acceleration measured by the acceleration measuring unit 25 attached to the superstructure 21 and the velocity measured by the velocity measuring unit 26.

Subsequently, in step A1, the collection unit 32 transfers the acceleration and the velocity to the impulsive force calculation unit 2. Further, the collection unit 32 transfers the velocity to the weight estimation unit 3.

Subsequently, the impulsive force calculation unit 2 calculates the impulsive force using the acceleration response representing the vibration generated by the vehicle 27 through the structure (step A2). Specifically, in step A2, the impulsive force calculation unit 2 first detects the period during which the vehicle 27 has passed through the expansion/contraction portion 23.

Subsequently, in step A2, the impulsive force calculation unit 2 executes a short-time Fourier transform (STFT) on the acceleration response representing the vibration generated by the vehicle 27 passing through the expansion/contraction portion 23. Subsequently, in step A2, the impulsive force calculation unit 2 applies the result of the short-time Fourier transform to the lower equation of Math. 1 to calculate the impulsive force. Subsequently, in step A2, the impulsive force calculation unit 2 transfers the calculated impulsive force to the weight estimation unit 3.

The weight estimation unit 3 estimates the weight of the vehicle 27 using the impulsive force calculated by the impulsive force calculation unit 2 (step A3). Specifically, the weight estimation unit 3 estimates the weight of the vehicle 27 by using any of the methods (1), (2), and (3) shown below.

(1) Method without using the regression model
  (1) In the method without using the regression model, the weight of the vehicle 27 is estimated without using the regression model. Specifically, in step A3, the weight estimation unit 3 first acquires the impulsive force from the impulsive force calculation unit 2.

Subsequently, in step A3, the weight estimation unit 3 applies the acquired impulsive force to Math. 2 to estimate the weight of the vehicle 27. For example, in step A3, the weight estimation unit 3 divides the impulsive force by the gravitational acceleration and the unit time to estimate the weight of the vehicle 27.

(2) Method using the regression model A
  (2) In the method using the regression model A, the regression model 34 is set as the regression model A. In that case, in step A3, the weight estimation unit 3 applies the impulsive force to the regression model 34 (regression model A) to estimate the weight of the vehicle 27.

Specifically, in step A3, the weight estimation unit 3 first acquires the impulsive force from the impulsive force calculation unit 2. Subsequently, the weight estimation unit 3 inputs the impulsive force into the regression model 34 (regression model A) to estimate the weight of the vehicle 27.

For example, in the method using the regression model A, the weight of the vehicle 27 is estimated using the regression model A as shown in Math. 3.

(3) Method of further using the velocity for the regression model B
  (3) In the method of using the regression model B, the regression model 34 shown in FIG. 3 is defined as the regression model B. In that case, in step A3, the weight estimation unit 3 inputs the impulsive force and the velocity of the vehicle 27 into the regression model 34 (regression model B) to estimate the weight of the vehicle 27.

Specifically, in step A3, the weight estimation unit 3 first acquires the impulsive force from the impulsive force calculation unit 2. Subsequently, the weight estimation unit 3 inputs the impulsive force and the velocity into the regression model 34 (regression model B) to estimate the weight of the vehicle 27.

For example, in the method using the regression model B, the weight of the vehicle 27 is estimated using the regression model B as shown in Math. 4.

Subsequently, the output information generation unit 33 acquires the estimated weight of the vehicle 27 from the weight estimation unit 3, and generates output information used to output the estimated weight to the output device 31 using the estimated weight (step A4). Subsequently, in step A4, the output information generation unit 33 outputs the generated output information to the output device 31.

The output device 31 outputs the estimated weight of the vehicle 27 using the output information (step A5).

The operation of the regression model generating apparatus will be described. As shown in FIG. 6, first, the collection unit 42 acquires a data set for each of a plurality of vehicles (step B1).

Specifically, in step B1, when generating the regression model A, the collection unit 42 acquires a data set in which the actual weight, the acceleration response, and the velocity for each of a plurality of vehicles are associated with each other, which is stored in the storage device 41, and transfers the acceleration response to the impulsive force calculation unit 2. Further, in step B1, the collection unit 42 transfers the actual weight and the velocity to the generation unit 44.

Alternatively, in step B1, when generating the regression model B, the collection unit 42 acquires a data set in which the actual weight, the acceleration response, and the velocity for each of a plurality of vehicles are associated with each other, which is stored in the storage device 41, and transfers the acceleration response to the impulsive force calculation unit 2. Further, in step B1, the collection unit 42 transfers the actual weight and the velocity to the generation unit 44.

The impulsive force calculation unit 43 calculates the impulsive force using the acceleration response (step B2). Specifically, in step B2, the impulsive force calculation unit 43 first acquires the acceleration response from the collection unit 42. Subsequently, in step B2, the impulsive force calculation unit 2 executes a short-time Fourier transform (STFT) for each acceleration response.

Subsequently, in step B2, the impulsive force calculation unit 43 applies the result of the short-time Fourier transform to the lower equation of Math. 1 to calculate the impulsive force for each of a plurality of vehicles. Subsequently, in step B2, the impulsive force calculation unit 2 transfers the calculated impulsive force for each of the plurality of vehicles to the generation unit 44.

The generation unit 44 generates a regression model using the data sets of a plurality of vehicles and stores the generated regression model (step B3).

Specifically, in step B3, when generating the regression model A, the generation unit 44 executes a regression analysis using the impulsive force and the actual weight of each of the plurality of vehicles to generate the regression model A shown in Math. 3. In that case, the generation unit 44 obtains parameters b0 and b1 such that the output value L1 of an error function is equal to or less than a predetermined value using the error function as shown in Math. 5.

Alternatively, in step B3, when generating the regression model B, the generation unit 44 executes a regression analysis using the impulsive force, the actual weight, and the velocity of each of the plurality of vehicles to generate the regression model B shown in Math. 4. In that case, the generation unit 44 obtains parameters b0, b1, and b2 such that the output value L2 of an error function is equal to or less than a predetermined value using the error function as shown in Math. 6.

Subsequently, the generation unit 44 stores the generated regression model A or regression model B in the storage device 41 (step b4). In step B4, the generation unit 44, may directly store the generated regression model A or regression model B in the weight estimation unit 3.

[Effect of the Example Embodiment]

As described above, according to the example embodiment, the weight of the moving object can be estimated using the impulsive force acquired from the acceleration response, so that the double integration in the time direction becomes unnecessary. That is, there is no decrease in the accuracy of the weight estimation of the moving object due to (i) the uncertainty of the integration boundary condition and (ii) the fact that the integration constant is not 0 (vibration around the origin is not established). Therefore, it is possible to improve the accuracy of weight estimation of the moving object.

Further, in the example embodiment, since it does not need the double integration in the time direction, the amount of calculation can be reduced as compared with the conventional case.

[Program]

It is sufficient for a weight estimation program according to the example embodiment to be a program that causes a computer to execute steps A1 to A5 shown in FIG. 5. The weight estimation apparatus and the weight estimation method according to the present example embodiment can be realized by installing this program in the computer and executing this program. In this case, a processor of the computer functions as the collection unit 32, the force calculation unit 2, the weight estimation unit 3, and the output information generation unit 33, and performs processing.

Also, the program according to the example embodiment may be executed by a computer system constructed with a plurality of computers. In this case, for example, the computers may respectively function as the collection unit 32, the force calculation unit 2, the weight estimation unit 3, and the output information generation unit 33.

It is sufficient for a regression model generation program according to the example embodiment to be any program that causes a computer to execute steps B1 to B4 shown in FIG. 6. The regression model generating apparatus and the regression model generation method according to the example embodiment can be realized by installing this program in the computer and executing this program. In this case, a processor of the computer functions as he collection unit 42, the impulsive force calculation unit 43, and the generation unit 44, and performs processing.

Further, it is sufficient for the program in the example embodiment to be executed by a computer system constructed by a plurality of computers. In this case, for example, each computer may function as any of the collection unit 42, the impulsive force calculation unit 43, and the generation unit 44, respectively.

[Physical Configuration]

Figure 7:
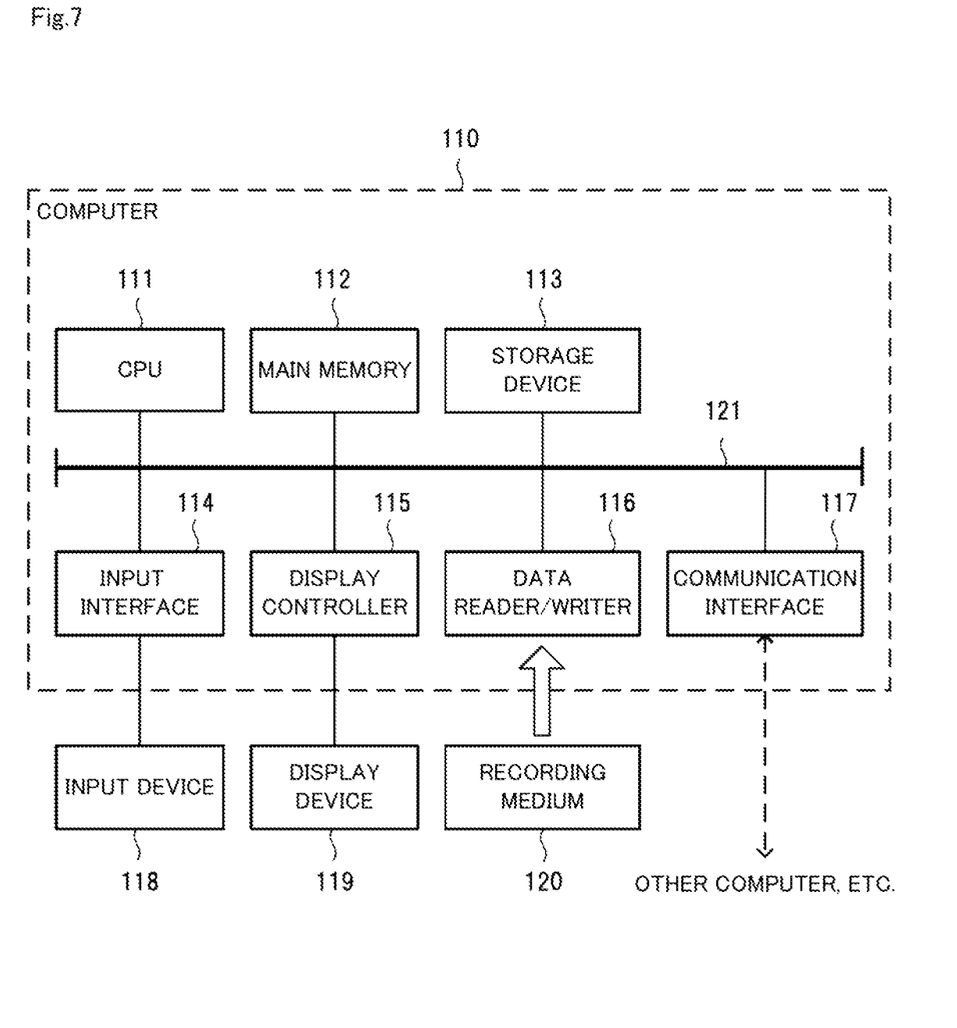
FIG. 7 illustrates an example of a computer for realizing the weight estimation apparatus or the regression model generating apparatus.

Here, a computer that realizes the weight estimation apparatus 1 by executing the program in the embodiment will be described with reference to FIG. 7. FIG. 7 is a diagram for showing one example of a computer realizing the weight estimation apparatus.

As illustrated in FIG. 6, a computer 110 includes a CPU 111, a main memory 112, a storage device 113, an input interface 114, a display controller 115, a data reader/writer 116, and a communication interface 117. These components are connected via a bus 121 so as to be capable of performing data communication with one another. Note that the computer 110 may include a graphics processing unit (GPU) or a field-programmable gate array (FPGA) in addition to the CPU 111 or in place of the CPU 111.

The CPU 111 loads the program (codes) in the example embodiment, which is stored in the storage device 113, onto the main memory 112, and performs various computations by executing these codes in a predetermined order. The main memory 112 is typically a volatile storage device such as a dynamic random access memory (DRAM) or the like. Also, the program in the example embodiment is provided in a state such that the program is stored in a computer readable recording medium 120. Note that the program in the example embodiment may also be a program that is distributed on the Internet, to which the computer 110 is connected via the communication interface 117.

In addition, specific examples of the storage device 113 include semiconductor storage devices such as a flash memory, in addition to hard disk drives. The input interface 114 mediates data transmission between the CPU 111 and input equipment 118 such as a keyboard and a mouse. The display controller 115 is connected to a display device 119, and controls the display performed by the display device 119.

The data reader/writer 116 mediates data transmission between the CPU 111 and the recording medium 120, and executes the reading of the program from the recording medium 120 and the writing of results of processing in the computer 110 to the recording medium 120. The communication interface 117 mediates data transmission between the CPU 111 and other computers.

Also, specific examples of the recording medium 120 include a general-purpose semiconductor storage device such as a CompactFlash (registered trademark, CF) card or a Secure Digital (SD) card, a magnetic recording medium such as a flexible disk, and an optical recording medium such as a compact disk read-only memory (CD-ROM).

Note that the weight estimation apparatus 1 and regression model generation apparatus 40 and in the example embodiment can also be realized by using pieces of hardware corresponding to the respective units, rather than using a computer on which the program is installed. Furthermore, a part of the weight estimation apparatus 1 and regression model generation apparatus 40 may be realized by using a program, and the remaining part of the diagnosis apparatus 1 may be realized by using hardware.

[Supplementary Note]

In relation to the above example embodiment, the following Supplementary notes are further disclosed. While a part of or the entirety of the above-described example embodiment can be expressed by (Supplementary note 1) to (Supplementary note 21) described in the following, the invention is not limited to the following description.

(Supplementary Note 1)

A weight estimation apparatus comprising:
an impulsive force calculation unit that executes a short-time Fourier transform on an acceleration response indicating vibration generated in a structure by a moving object moving through the structure, and calculating an impulsive force using a result of the short-time Fourier transform; and
a weight estimation unit that estimates a weight of the moving object using the impulsive force.

(Supplementary Note 2)

The weight estimation apparatus according to Supplementary note 1, wherein
the weight estimation unit estimates the weight of the moving object by using the impulsive force, a gravitational acceleration, and a unit time representing a window size used in the short-time Fourier transform.

(Supplementary Note 3)

The weight estimation apparatus according to Supplementary note 1, wherein
the weight estimation unit estimates the weight of the moving object by using the calculated impulsive force as an input in a regression model used for estimating the weight of the moving object.

(Supplementary Note 4)

The weight estimation apparatus according to Supplementary note 3, wherein
the regression model is generated using a predetermined data set for each of the moving objects, in which the acceleration response and an actual weight are associated.

(Supplementary Note 5)

The weight estimation apparatus according to Supplementary note 1, wherein
the weight estimation unit estimates the weight of the moving object by using the calculated impulsive force and a velocity of the moving object as an input in the regression model used for estimating the weight of the moving object.

(Supplementary Note 6)

The weight estimation apparatus according to Supplementary note 5, wherein
the regression model is generated using a predetermined data set for each of the moving objects, in which the acceleration response, the actual weight and the velocity are associated.

(Supplementary Note 7)

The weight estimation apparatus according to any one of Supplementary notes 1 to 6, wherein
the acceleration response is measured at a position that is not easily affected by the natural vibration of the structure.

(Supplementary Note 8)

A weight estimation method comprising:
(a) a step of executing a short-time Fourier transform on an acceleration response indicating vibration generated in a structure by a moving object moving through the structure, and calculating an impulsive force using a result of the short-time Fourier transform; and
(b) a step of estimating a weight of the moving object using the impulsive force.

(Supplementary Note 9)

The weight estimation method according to Supplementary note 8, wherein
in the (b) step, estimating the weight of the moving object by using the impulsive force, a gravitational acceleration, and a unit time representing a window size used in the short-time Fourier transform.

(Supplementary Note 10)

The weight estimation method according to Supplementary note 8, wherein
in the (b) step, estimating the weight of the moving object by using the calculated impulsive force as an input in a regression model used for estimating the weight of the moving object.

(Supplementary Note 11)

The weight estimation method according to Supplementary note 10, wherein
the regression model is generated using a predetermined data set for each of the moving objects, in which the acceleration response and an actual weight are associated.

(Supplementary note 12)

The weight estimation apparatus according to Supplementary note 8, wherein
in the (b) step, estimating the weight of the moving object by using the calculated impulsive force and a velocity of the moving object as an input in the regression model used for estimating the weight of the moving object.

(Supplementary Note 13)

The weight estimation apparatus according to Supplementary note 12, wherein
the regression model is generated using a predetermined data set for each of the moving objects, in which the acceleration response, the actual weight and the velocity are associated.

(Supplementary Note 14)

The weight estimation method according to any one of Supplementary notes 8 to 13, wherein
the acceleration response is measured at a position that is not easily affected by the natural vibration of the structure.

(Supplementary Note 15)

A computer-readable recording medium for recording a program including instructions that cause a computer to:
(a) a step of executing a short-time Fourier transform on an acceleration response indicating vibration generated in a structure by a moving object moving through the structure, and calculating an impulsive force using a result of the short-time Fourier transform; and
(b) a step of estimating a weight of the moving object using the impulsive force.

(Supplementary Note 16)

The computer-readable recording medium according to Supplementary note 15, wherein
in the (b) step, estimating the weight of the moving object by using the impulsive force, a gravitational acceleration, and a unit time representing a window size used in the short-time Fourier transform.

(Supplementary Note 17)

The computer-readable recording medium according to Supplementary note 15, wherein
in the (b) step, estimating the weight of the moving object by using the calculated impulsive force as an input in a regression model used for estimating the weight of the moving object.

(Supplementary Note 18)

The computer-readable recording medium according to Supplementary note 17, wherein
the regression model is generated using a predetermined data set for each of the moving objects, in which the acceleration response and an actual weight are associated.

(Supplementary Note 19)

The computer-readable recording medium according to Supplementary note 15, wherein
- in the (b) step, estimating the weight of the moving object by using the calculated impulsive force and a velocity of the moving object as an input in the regression model used for estimating the weight of the moving object.

(Supplementary Note 20)

The computer-readable recording medium according to Supplementary note 19, wherein
- the regression model is generated using a predetermined data set for each of the moving objects, in which the acceleration response, the actual weight and the velocity are associated.

(Supplementary Note 21)

The computer-readable recording medium according to Supplementary notes 15 to 20, wherein
- the acceleration response is measured at a position that is not easily affected by the natural vibration of the structure.

The invention has been described with reference to an example embodiment above, but the invention is not limited to the above-described example embodiment. Within the scope of the invention, various changes that could be understood by a person skilled in the art could be applied to the configurations and details of the invention.

INDUSTRIAL APPLICABILITY

As described above, according to the invention, it is possible to improve an accuracy of a weight estimation of a moving object. The invention is useful in fields where it is necessary to estimate a weight of a moving object moving through a structure.

REFERENCE SIGNS LIST

1 Weight estimation apparatus
2 Impulsive force calculation unit
3 Weight estimation unit
21 Superstructure
22 Substructure
23 Expansion/Contraction portion
24 Bearing
25 Acceleration measurement unit
26 Velocity measurement unit
27 Vehicle
31 Output device
32 Collection unit
33 Output information generation unit
34 Regression model
40 Regression model generation apparatus
41 Storage device
42 Collection unit
43 Impulsive force calculation unit
44 Generation unit
110 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. A weight estimation apparatus comprising:
   at least one memory storing instructions; and
   at least one processor configured to execute the instructions to:
   execute a short-time Fourier transform on an acceleration response indicating vibration generated in a structure by a moving object moving through the structure, and calculate an impulsive force using a result of the short-time Fourier transform; and
   estimate a weight of the moving object by using the impulsive force, a gravitational acceleration, and a unit time representing a window size used in the short-time Fourier transform.

2. The weight estimation apparatus according to claim 1, wherein the one or more processors further executes the instructions to:
   estimate the weight of the moving object by using the calculated impulsive force as an input to a regression model configured for estimating the weight of the moving object.

3. The weight estimation apparatus according to claim 2, wherein
   the regression model is generated using a predetermined data set for each of a plurality of sample moving objects, in which an acceleration response and an actual weight are associated with each of the plurality of sample moving objects.

4. The weight estimation apparatus according to claim 2, wherein
   the regression model is generated using a predetermined data set for each of a plurality of sample moving objects, in which an acceleration response, an actual weight and a velocity are associated with each of the plurality of sample moving objects.

5. The weight estimation apparatus according to claim 1, wherein
   the acceleration response is measured at a position that is not easily affected by the natural vibration of the structure.

6. A weight estimation method performed by at least one computer processor, the method comprising:
   executing a short-time Fourier transform on an acceleration response indicating vibration generated in a structure by a moving object moving through the structure, and calculating an impulsive force using a result of the short-time Fourier transform; and
   estimating a weight of the moving object by using the impulsive force, a gravitational acceleration, and a unit time representing a window size used in the short-time Fourier transform.

7. The weight estimation method according to claim 6, wherein
   in the estimating, estimating the weight of the moving object by using the calculated impulsive force as an input in to a regression model used configured for estimating the weight of the moving object.

8. The weight estimation method according to claim 7, wherein
   the regression model is generated using a predetermined data set for each of a plurality of sample moving objects, in which an acceleration response and an actual weight are associated with each of the plurality of sample moving objects.

9. The weight estimation apparatus according to claim 7, wherein
the regression model is generated using a predetermined data set for each of a plurality of sample moving objects, in which an acceleration response, an actual weight and a velocity are associated with each of the plurality of sample moving objects.

10. The weight estimation method according to claim 6, wherein
the acceleration response is measured at a position that is not easily affected by the natural vibration of the structure.

11. A non-transitory computer-readable recording medium for recording a program including instructions that cause a computer to perform operations comprising:
executing a short-time Fourier transform on an acceleration response indicating vibration generated in a structure by a moving object moving through the structure, and calculating an impulsive force using a result of the short-time Fourier transform; and
estimating a weight of the moving object by using the impulsive force, a gravitational acceleration, and a unit time representing a window size used in the short-time Fourier transform.

12. The non-transitory computer-readable recording medium according to claim 11, wherein
in the estimating, estimating the weight of the moving object by using the calculated impulsive force as an input to a regression model configured for estimating the weight of the moving object.

13. The non-transitory computer-readable recording medium according to claim 12, wherein
the regression model is generated using a predetermined data set for each of a plurality of sample moving objects, in which an acceleration response and an actual weight are associated with each of the plurality of sample moving objects.

14. The non-transitory computer-readable recording medium according to claim 12, wherein
the regression model is generated using a predetermined data set for each of a plurality of sample moving objects, in which an acceleration response, an actual weight and a velocity are associated with each of the plurality of sample moving objects.

15. The weight estimation apparatus according to claim 1, wherein the gravitational acceleration is measured by an acceleration measurement device and input to the weight estimation apparatus.

16. A weight estimation apparatus comprising:
at least one memory storing instructions; and
at least one processor configured to execute the instructions to:
execute a short-time Fourier transform on an acceleration response indicating vibration generated in a structure by a moving object moving through the structure, and calculate an impulsive force using a result of the short-time Fourier transform; and
estimate the weight of the moving object by using the calculated impulsive force and a velocity of the moving object as an input in a regression model used for estimating the weight of the moving object.

17. The weight estimation apparatus according to claim 16, wherein the velocity of the moving object is measured by a velocity measurement device and input to the weight estimation apparatus.

18. A weight estimation method performed by at least one computer processor, the method comprising:
executing a short-time Fourier transform on an acceleration response indicating vibration generated in a structure by a moving object moving through the structure, and calculating an impulsive force using a result of the short-time Fourier transform; and
estimating a weight of the moving object by using the impulsive force and a velocity of the moving object as an input in a regression model used for estimating the weight of the moving object.

19. A non-transitory computer-readable recording medium for recording a program including instructions that cause a computer to perform operations comprising:
executing a short-time Fourier transform on an acceleration response indicating vibration generated in a structure by a moving object moving through the structure, and calculating an impulsive force using a result of the short-time Fourier transform; and
estimating a weight of the moving object by using the impulsive force and a velocity of the moving object as an input in a regression model used for estimating the weight of the moving object.

* * * * *